United States Patent
Jaradi et al.

(10) Patent No.: US 11,618,404 B1
(45) Date of Patent: Apr. 4, 2023

(54) SEAT AIRBAG WITH BELT AND SPOOL

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/536,602

(22) Filed: Nov. 29, 2021

(51) Int. Cl.
*B60R 21/207* (2006.01)
*B60R 21/2338* (2011.01)

(52) U.S. Cl.
CPC ........ *B60R 21/207* (2013.01); *B60R 21/2338* (2013.01)

(58) Field of Classification Search
None
See application file for complete search history.

(56) References Cited

U.S. PATENT DOCUMENTS

| 11,052,861 | B2 | 7/2021 | Park et al. |
| 11,084,447 | B2 | 8/2021 | Rupp et al. |
| 11,124,147 | B2 * | 9/2021 | Line ................ B60R 21/207 |
| 11,383,667 | B1 * | 7/2022 | Kadam ............ B60R 21/2338 |
| 2010/0025972 | A1 * | 2/2010 | Nezaki ............... B60R 22/26 |
| | | | 280/730.1 |
| 2021/0009068 | A1 | 1/2021 | Farooq et al. |

FOREIGN PATENT DOCUMENTS

| DE | 102017131121 A1 | 6/2019 | |
| JP | 2018135016 A * | 8/2018 | ............. B60R 21/00 |
| KR | 20120019622 A * | 3/2012 | ........... B60R 21/213 |
| KR | 102064842 B1 * | 1/2020 | ........... B60R 21/207 |

* cited by examiner

*Primary Examiner* — Faye M Fleming
(74) *Attorney, Agent, or Firm* — Frank A. MacKenzie; Bejin Bieneman PLC

(57) ABSTRACT

An assembly includes a seat having a seatback. The assembly includes an airbag supported by the seatback and inflatable to an inflated position. The airbag extends from the seatback to an end in the inflated position. The assembly includes a spool rotatably supported by the seatback. The assembly includes a belt extending along the airbag in the inflated position. The belt extends from the spool to the end of the airbag. The belt is extendable from the spool.

20 Claims, 7 Drawing Sheets

SEAT AIRBAG WITH BELT AND SPOOL

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

DETAILED DESCRIPTION

Figure 1:
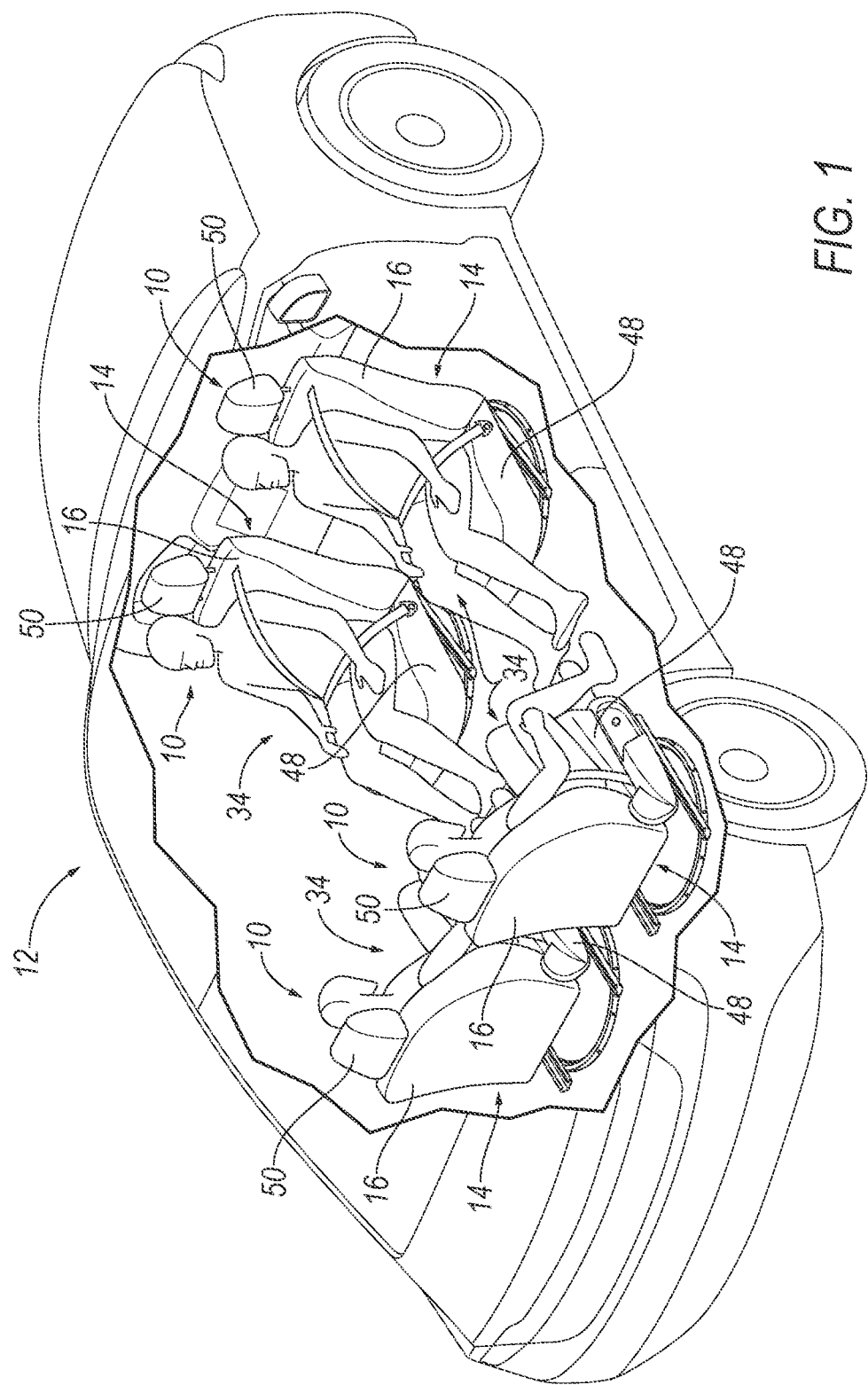
FIG. 1 is a perspective view of a vehicle having seats.

An assembly includes a seat having a seatback. The assembly includes an airbag supported by the seatback and inflatable to an inflated position. The airbag extends from the seatback to an end in the inflated position. The assembly includes a spool rotatably supported by the seatback. The assembly includes a belt extending along the airbag in the inflated position. The belt extends from the spool to the end of the airbag. The belt is extendable from the spool.

The airbag may be inflatable from an uninflated position to the inflated position, the belt being wound around the spool in the uninflated position.

The belt may include a first end anchored to the spool relative to the seat and a second end connected to the end of the airbag.

The assembly may include a second belt spaced from the belt in a cross-seat direction.

The second belt may extend along the airbag in the inflated position, the belt and the second belt being spaced from each other in a cross-seat direction.

The assembly may include a second spool supported by the seatback and spaced from the spool, the second belt extending from the spool to the end of the airbag.

The seat may include a head restraint supported by the seatback, the head restraint being between the spool and the belt.

The airbag may include a first inflation chamber and a second inflation chamber, the belt extending along the first inflation chamber and the second belt extending along the second inflation chamber.

The airbag may include an outer panel and an inner panel between the outer panel and the seat, the belt extending along the outer panel of the airbag.

The seat may include a seat bottom supporting the seatback, a tether retractor supported by the seat bottom and connected to the airbag, the tether retractor being retractable when the airbag is in the inflated position.

The assembly may include a tether extending from the tether retractor to the end of the airbag.

The tether may extend along the seat bottom when the airbag is in an uninflated position.

The airbag may inflate in a seat-forward direction.

The belt may extend from the spool in a seat-forward direction.

The seatback may define an occupant seating area, the airbag surrounds the occupant seating area in the inflated position.

The occupant seating area may be between the belt and the seat when the airbag is in the inflated position.

The belt may be attached to the airbag by a stitch.

The assembly may include a second belt extending along the airbag, the belt extending in a cross-seat direction along the end of the airbag.

With reference to the Figures, wherein like numerals indicate like parts throughout the several views, an assembly 10 for a vehicle 12 includes a seat 14 having a seatback 16. The assembly 10 includes an airbag 18 supported by the seatback 16 and inflatable to an inflated position. The airbag 18 extends from the seatback 16 to an end 20 in the inflated position. The assembly 10 includes a spool 22 rotatably supported by the seatback 16. The assembly 10 includes a belt 28 extending along the airbag 18 in the inflated position. The belt 28 extends from the spool 22 to the end 20 of the airbag 18. The belt 28 is extendable from the spool 22.

In the event of an impact to the vehicle 12, the airbag 18 inflates to the inflated position to surround an occupant of the seat 14. The airbag 18 may control the kinematics of the occupant in the seat 14 and limit the occupant's interaction with other occupants in the event of an impact. When the airbag 18 inflates, the belt 28 extends from the spool 22 as the spool 22 rotates relative to the seatback 16. The belt 28 length increases as the airbag 18 moves to the inflated position to provide tension over the shoulder of an occupant of the seat 14. The belt 28 may guide the airbag 18 over the shoulders of the occupant as the airbag 18 moves toward the inflated position. The belt 28 may tighten over the shoulder of the occupant to control the kinematics of the occupant in conjunction with the airbag 18 in the event of an impact to the vehicle 12. The spool 22 applied tension to the belts 28 as the airbag 18 over the shoulders of the occupant of the seat 14.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a body (not numbered) including rockers, roof rails, pillars, body panels, vehicle floor (not numbered), vehicle roof (not numbered), etc. The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

With continued reference to FIG. 1, the vehicle 12 may include one or more seats 14. Specifically, the vehicle 12 may include any suitable number of seats 14. The seats 14 are supported by a vehicle floor (not numbered). The seats 14 may be arranged in any suitable arrangement in the passenger compartment. As in the example shown in the Figures, one or more of the seats 14 may be at the front end of the passenger compartment, e.g., a driver seat and/or a passenger seat. In other examples, one or more of the seats 14 may be behind the front end of the passenger compartment, e.g., at the rear end of the passenger compartment. The seats 14 may be movable relative to the vehicle floor to various positions, e.g., movable fore-and-aft and/or cross-vehicle. The seat 14 may be of any suitable type, e.g., a bucket seat.

The seats 14 include a seatback 16, a seat bottom 48, and a head restraint 50. The head restraint 50 may be supported by and extending upwardly from the seatback 16. The head restraint 50 may be stationary or movable relative to the seatback 16. The seatback 16 may be supported by the seat bottom 48 and may be stationary or movable relative to the seat bottom 48. The seatback 16 may extend from an upper end (not numbered) to a lower end (not numbered). The lower end may be connected to the seat bottom 48. The upper end of the seatback 16 may be spaced upwardly from the lower end of the seatback 16, i.e., upwardly from the seat bottom 48. The seatback 16, the seat bottom 48, and the head restraint 50 may be adjustable in multiple degrees of freedom. Specifically, the seatback 16, the seat bottom 48, and the head restraint 50 may themselves be adjustable. In other words, adjustable components within the seatback 16, the seat bottom 48, and the head restraint 50 may be adjustable relative to each other.

Figure 2:
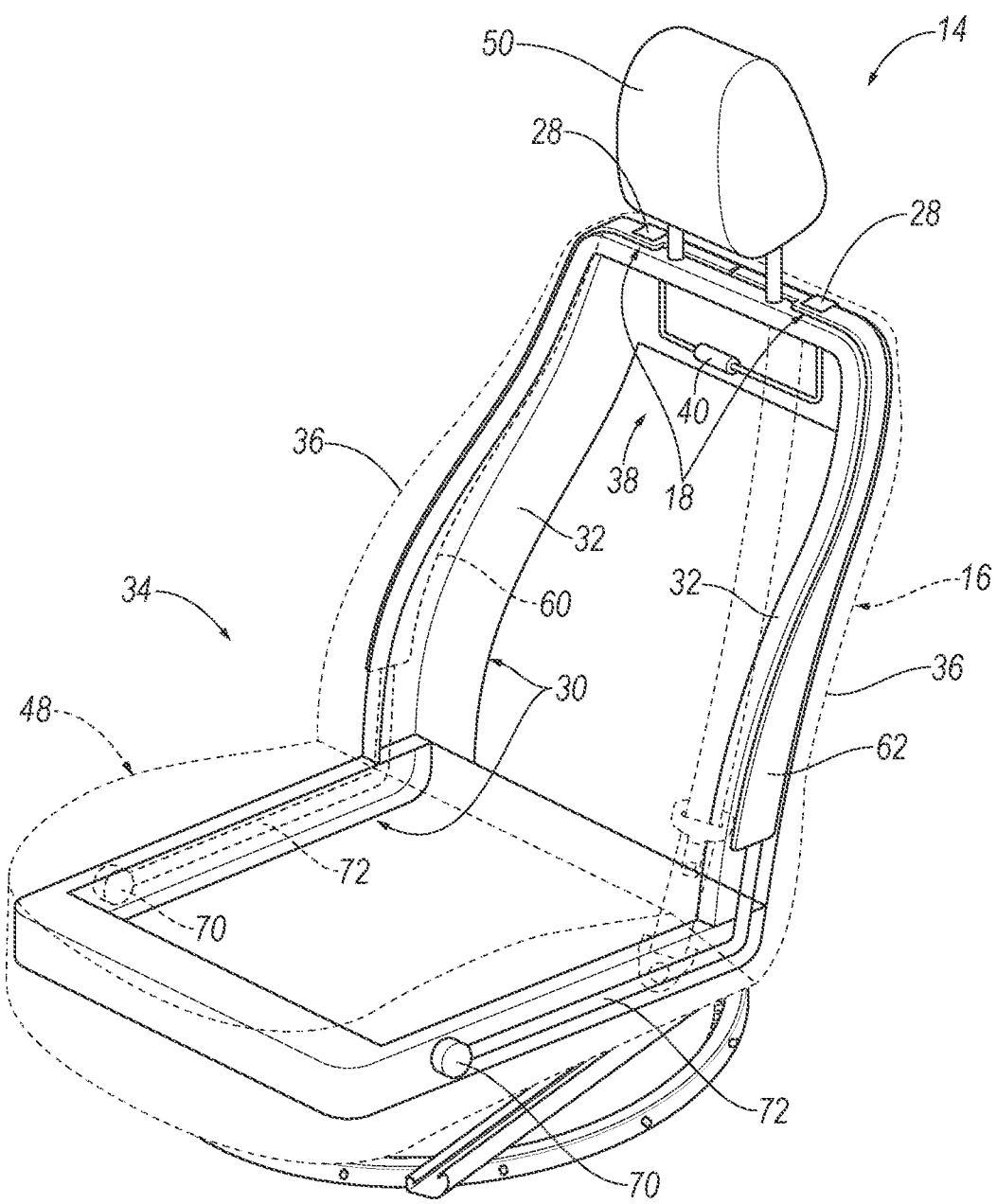
FIG. 2 is a perspective view of one of the seats having an airbag assembly supported by a seatback of the seat.
Figure 3:
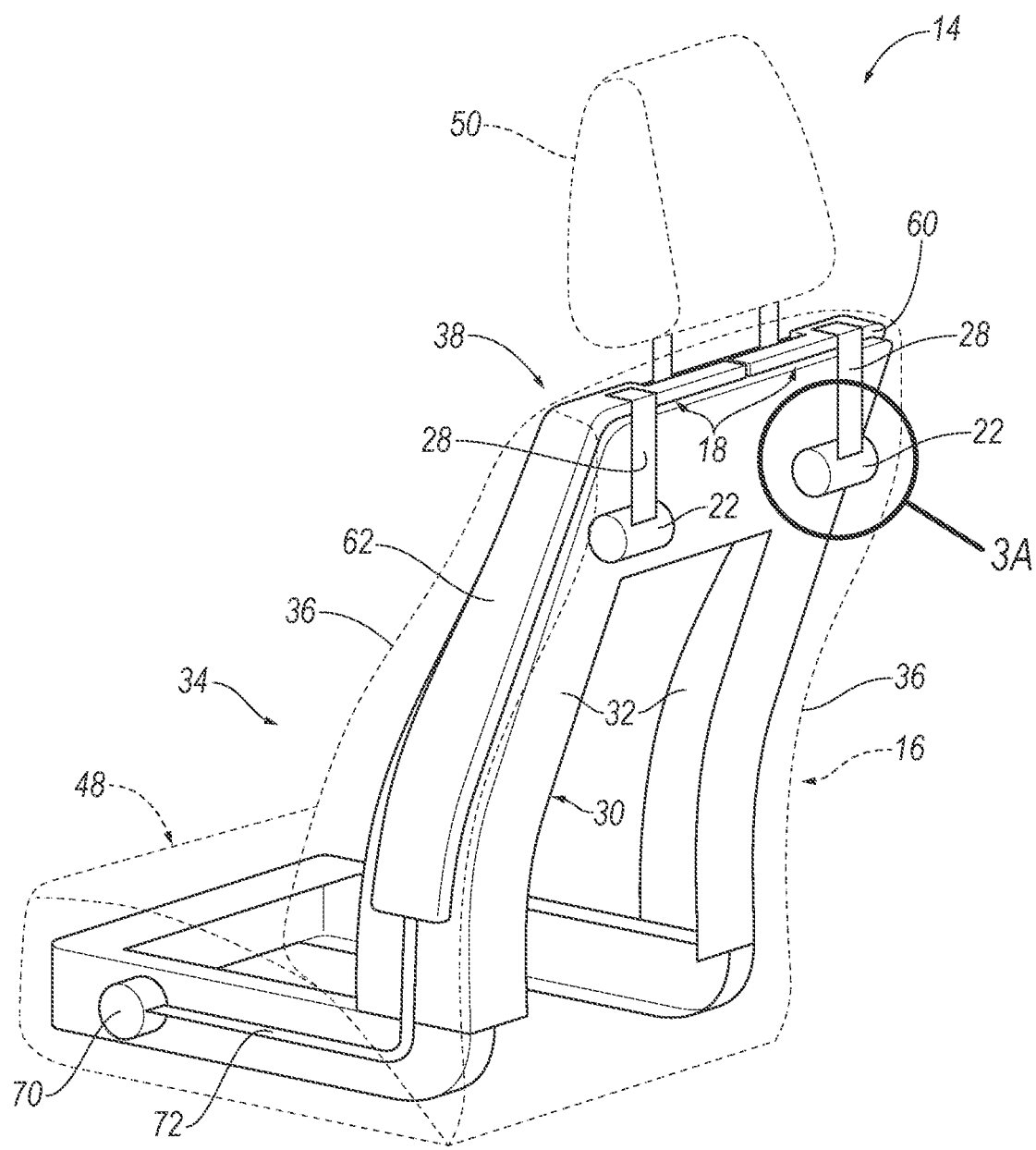
FIG. 3 is a perspective view of a backside of the seat having the airbag assembly.

With reference to FIGS. 2 and 3, the seatback 16 includes a frame 30 and a covering (not numbered) supported on the frame 30. The frame 30 may include tubes, beams, etc. Specifically, the frame 30 includes a pair of upright frame members 32. The upright frame members 32 are elongated, and specifically, are elongated in a generally upright direction when the seatback 16 is in a generally upright position. The upright frame members 32 are spaced from each other and the frame 30 includes one or move cross-members (not numbered) extending between the upright frame members 32. The frame 30, including the upright frame members 32, may be of any suitable plastic material, e.g., carbon fiber reinforced plastic (CFRP), glass fiber-reinforced semi-finished thermoplastic composite (organosheet), etc. As another example, some or all components of the frame 30 may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the frame 30. The padding may be between the covering and the frame 30 and may be foam or any other suitable material.

Each seat 14 may rotate about an axis (not numbered) that extends through the vehicle roof and the vehicle floor. For example, the seats 14 may rotate between a forward-facing position and a rearward-facing position. In the forward-facing position, an occupant of the seat 14 faces the front end of the passenger compartment. In the rearward-facing position, an occupant of the seat 14 faces the rear end of the passenger compartment. The seats 14 may rotate completely, i.e., 360°, about the axis. The seats 14 may rotate between fixed positions, e.g., the forward-facing position and the rearward-facing position, or may be rotatable to an infinite number of positions.

The seat bottom 48 and seatback 16 may define a cross-seat midline M. The cross-seat midline M may extend equidistantly from either side of the seat bottom 48 and the seatback 16. When the seat 14 is in the forward-facing position or the rearward-facing position, the cross-seat midline M may extend along a vehicle-longitudinal axis, i.e., an axis that extends from the front end of the passenger compartment to the rear end of the passenger compartment. When the seat 14 is in a position offset from the forward-facing position or the rearward-facing position, the cross-seat midline M may be offset from the forward-facing position or the rearward-facing position.

With continued reference to FIGS. 2 and 3, the seatback 16 defines an occupant seating area 34 of the seat 14. The occupant seating area 34 is the area occupied by an occupant when properly seated on the seat bottom 48 and the seatback 16. The occupant seating area 34 is in a seat-forward direction of the seatback 16 and above the seat bottom 48. In the example shown in the Figures, the occupant seating area 34 faces the front end of the passenger compartment when the seat 14 is in the forward-facing position and the occupant seating area 34 faces the rear end of the passenger compartment when the seat 14 is in the rearward-facing position.

The seatback 16 may have bolsters 36 on opposite sides of the occupant seating area 34. The bolsters 36 are elongated, and specifically, are elongated in a generally upright direction when the seatback 16 is in a generally upright position. The bolsters 36 define cross-seat boundaries of the seatback 16, i.e., the seatback 16 terminates at the bolsters 36. The bolsters 36 may extend in a seat-forward direction relative to the occupant seating area 34, i.e., on opposite sides of the torso and shoulders of an occupant seated on the seat 14. The extension of the bolsters 36 relative to the occupant seating area 34 may be defined by the upright frame members 32 and/or the covering. In the example shown in the Figures, the size and shape of both the upright frame members 32 and the covering form the bolsters 36.

With reference to FIGS. 2-6, one or more of the seats 14 may include an airbag assembly 38. The airbag assembly 38 includes the airbag 18, an inflator 40, and may include a housing (not shown). The airbag 18 includes a first inflation chamber 60 and a second inflation chamber 62. The vehicle 12 may include any suitable number of airbag assemblies 38. As one example, each of the seats 14 of the vehicle 12 may include one airbag assembly 38. In examples including more than one airbag assembly 38, for example, each seat 14 having an airbag assembly 38, the airbag assemblies 38 may each be identical or substantially identical to each other. As shown in FIGS. 2 and 3, the airbag assembly 38 may extend along the frame 30 of the seat 14 when the inflation chambers 60, 62 are in an uninflated position. Specifically, the inflation chambers 60, 62 may extend along the upright frame members 32 and across an upper cross-member of the frame 30 of the seat 14 in the uninflated position.

The airbag assembly 38, i.e., the airbag 18, is supported by the seatback 16.

Specifically, the first inflation chamber 60 and the second inflation chamber 62 are each supported by the seat 14, specifically, the seatback 16. The airbag 18, i.e., the first inflation chamber 60 and the second inflation chamber 62, is supported by the frame 30 of the seat 14 at the upper end of the seatback 16. In an example in which the airbag assembly 38 includes the housing, the housing may be fixed directly to the frame 30 of the seat 14, e.g., the frame 30 of the seatback 16. The airbag assembly 38 may be fixed to the upper end of the frame 30 of the seatback 16. The airbag assembly 38 may be concealed by the covering, e.g., the upholstery of the seat 14. In other words, the airbag assembly 38 may be between the frame 30 of the seat 14 and the upholstery of the seat 14. The covering may be releasable along the inflation chambers 60, 62, e.g., the covering may include a tear seam 64 along the frame 30 that is releasable as the inflation chambers 60, 62 move from the uninflated position to the inflated position.

The first inflation chamber 60 and the second inflation chamber 62 are each inflatable from the uninflated position to the inflated position. In the inflated position, the first inflation chamber 60 and the second inflation chamber 62 each extend from the seatback 16 of the seat 14 and away from the seatback 16 of the seat 14 to the end 20, i.e., the airbag extends from the seatback 16 to the end 20. The end 20 of the airbag may be at or around the knees of an occupant that may be seated in the seat 14. Both the first inflation chamber 60 and the second inflation chamber 62 inflate to the inflated position simultaneously, i.e., at the same time. The first inflation chamber 60 may extend from one side of the seatback 16 and the second inflation chamber 62 extends from the other side of the seatback 16. Specifically, the first inflation chamber 60 extends from one of the bolsters 36 of the seatback 16 and the second inflation chamber 62 extends from the other of the bolsters 36 of the seatback 16. The inflation chambers 60, 62 extend around the occupant seating area 34 from one bolster 36 to the other bolster 36. Specifically, the inflation chambers 60, 62 may be elongated in a round path from one bolster 36 to the other bolster 36. The inflation chambers 60, 62 may extend in a rounded path from one bolster 36 to the other bolster 36 around the occupant seating area 34. The airbag 18 surrounds the occupant seating area 34 between the airbag 18 and the seatback 16 in the inflated position. Specifically, the inflation chambers 60, 62 surround the occupant seating area 34 when the inflation chambers 60, 62 are in the inflated position. The inflation chambers 60, 62 may surround an occupant seated in the occupant seating area 34 when the inflation chambers 60, 62 are in the inflated position. The first inflation chamber 60 and the second inflation chamber 62 are between the vehicle roof and the occupant seating area 34, i.e., overhead of the occupant in the occupant seating area 34. Accordingly, the inflation chambers 60, 62 control the kinematics of the occupant seated in the seat 14 and may separate the occupant of the seat 14 from other vehicle occupants in the vehicle 12 in the event of the impact.

The first inflation chamber 60 and the second inflation chamber 62 extend from the bolsters 36 of the seatback 16 and converge to a gap 42. The gap 42 extends from the first inflation chamber 60 to the second inflation chamber 62. In the example shown in the Figures, the gap 42 may extend from the seatback 16 along the cross-seat midline M. In other examples, the gap 42 may be offset from the cross-seat midline M.

Figure 4:
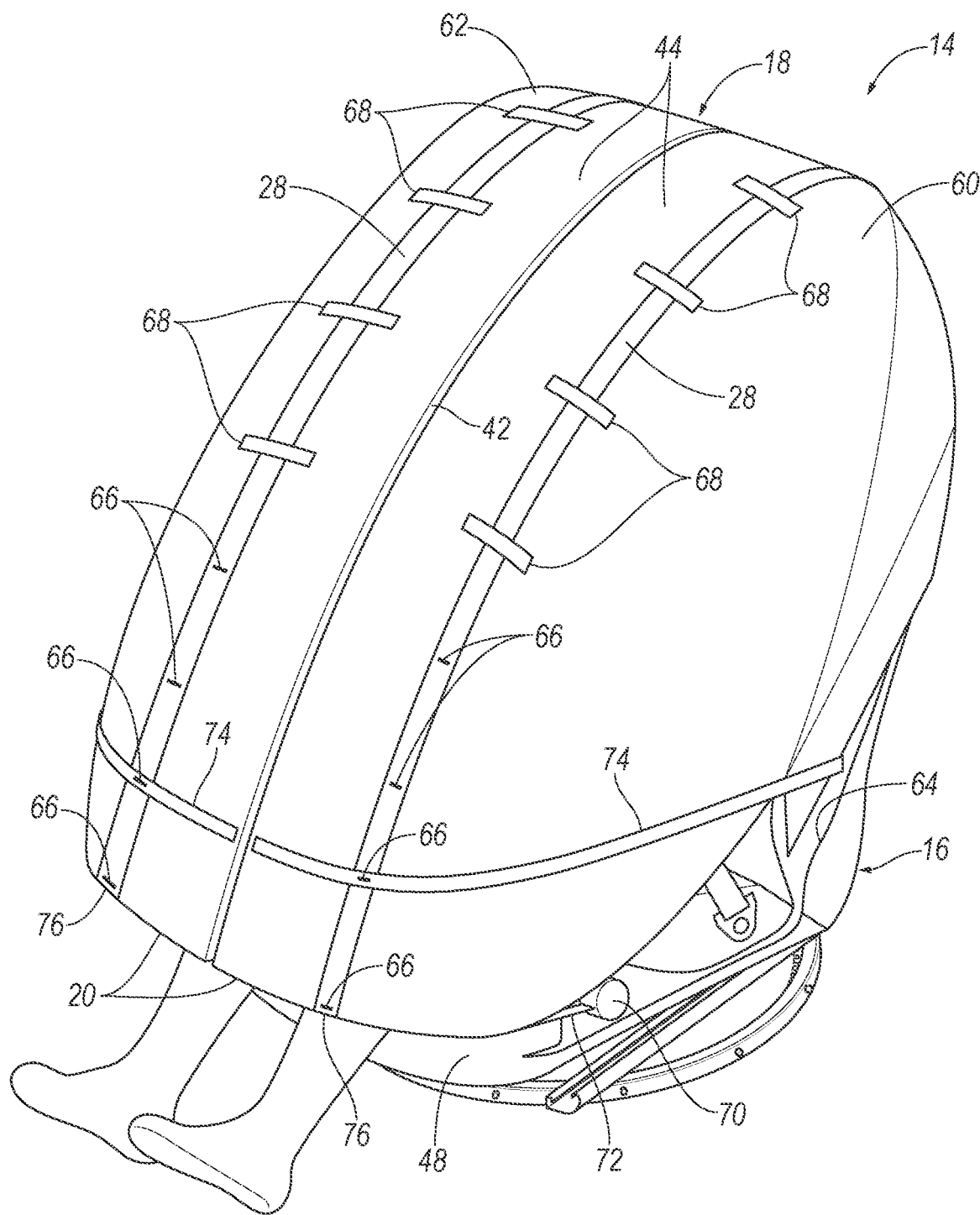
FIG. 4 is a perspective view of the seat with an airbag of the airbag assembly in an inflated position.
Figure 5:
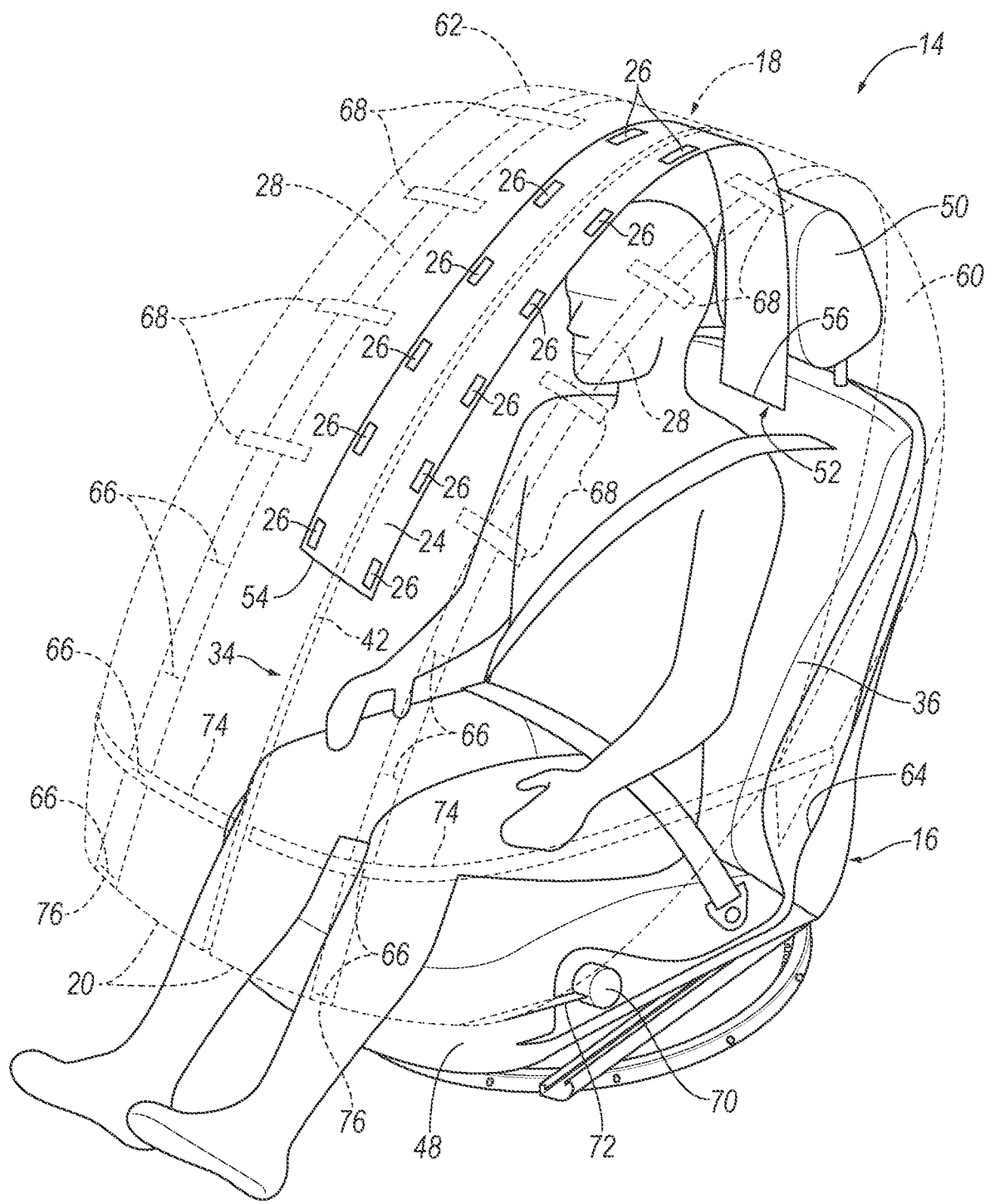
FIG. 5 is a perspective view of the seat with the airbag of the airbag assembly in the inflated position.
Figure 6:
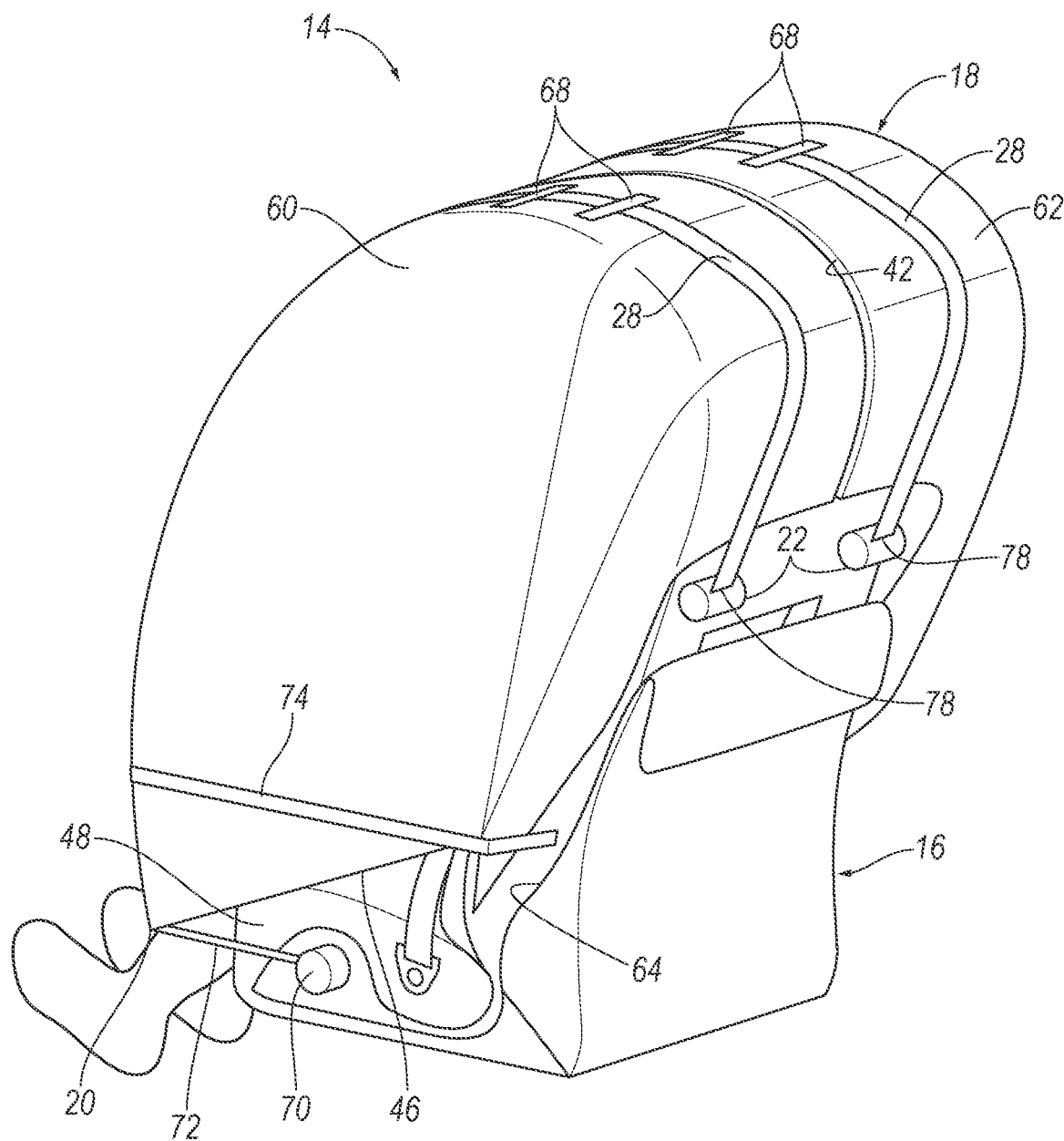
FIG. 6 is a perspective view of the backside of the seat with the airbag of the airbag assembly in the inflated position.

As in the example shown in FIGS. 4-6, the first inflation chamber 60 and the second inflation chamber 62 may abut each other at the gap 42. In other examples, the first inflation chamber 60 and the second inflation chamber 62 may be spaced from each other along part of or all of the gap 42. The airbag 18 inflates in the seat-forward direction from the seatback 16. Specifically, the first inflation chamber 60 and the second inflation chamber 62 each inflate in the seat-forward direction from the seatback 16 and converge to the gap 42. The seat-forward direction faces the same direction an occupant faces when seated in the seat 14. Specifically, the occupant seating area 34 is in a seat-forward direction of the seatback 16 and above the seat bottom 48. The first inflation chamber 60 and the second inflation chamber 62 inflates away from the seatback 16 in the seat-forward direction.

The airbag 18 includes an outer panel 44 and an inner panel 46. Specifically, the first inflation chamber 60 and the second inflation chamber 62 each include an outer panel 44 and an inner panel 46. In the inflated position, the outer panels 44 of each of the inflation chambers 60, 62 faces toward the passenger compartment and the inner panels 46 face toward the seat 14. In other words, the inner panels 46 are between the outer panels 44 and the seat 14. Specifically, the inner panel 46 faces toward the occupant seating area 34 and the occupant seated in the seat 14. In other words, the inner panel 46 is between the occupant and the outer panel 44. The outer panels 44 and the inner panels 46 may extend from the seatback 16, specifically, the bolsters 36 of the seatback 16, to the gap 42 between the first inflation chamber 60 and the second inflation chamber 62. In the event of an impact to the vehicle 12, the occupant of the seat 14 may contact the inner panel 46 and the first inflation chamber 60 and the second inflation chamber 62 may control the kinematics of the occupant.

The inflator 40 may be supported by the frame 30 of the seatback 16. The inflator 40 is fluidly connected to the first inflation chamber 60 and the second inflation chamber 62. In such an example, the inflator 40 expands the first inflation chamber 60 and the second inflation chamber 62 with inflation medium, such as a gas, to move the inflation chambers 60, 62 from the uninflated position to the inflated position. In other examples, the airbag assembly 38 may include a second inflator (not shown). In such an example, the inflator 40 may be fluidly connected to the first inflation chamber 60 and the second inflator may be fluidly connected to the second inflation chamber 62. The inflator 40 may expand the first inflation chamber 60 to the inflated position and the second inflator may expand the second inflation chamber 62 to the inflated position. The airbag assembly 38 may include any suitable number of inflators 40 to expand the first inflation chamber 60 and the second inflation chamber 62 to the inflated positions. The inflator 40 may be, for example, a pyrotechnic inflator that ignites a chemical reaction to generate the inflation medium, a stored gas inflator that releases (e.g., by a pyrotechnic valve) stored gas as the inflation medium, or a hybrid.

With reference to FIGS. 2-6 and as discussed above, the assembly 10 includes a belt 28 extending along the airbag 18 in the inflated position. Specifically, the assembly 10 may include a pair of belts 28, i.e., the belt 28 and a second belt, extending along the airbag 18 in the inflated position to the end 20 of the airbag 18. The occupant seating area 34 may between the belt 28 and the seat 14 when the airbag 18 is in the inflated position. Specifically, the belts 28 may extend over the shoulders of an occupant seated in the seat 14 to control the kinematics of the occupant seated in the seat 14. The belts 28 may be identical to each other. The belts 28 may be of any suitable material to control the kinematics of the occupant in the seat 14. Specifically, the belts 28 may be a fabric, e.g., woven nylon.

The belts 28 may extend along the outer panel 44 of the airbag 18 to the end 20 of the airbag 18 in the inflated position. Specifically, one of the belts 28 may extend along first inflation chamber 60 and the other of the belts 28 may extend along the second inflation chamber 62 in the inflated position. The belts 28 may be spaced from each other in the cross-seat direction. The head restraint 50 of the seat 14 may be between the belts 28 in the uninflated position and in the inflated position.

Figure 3A:
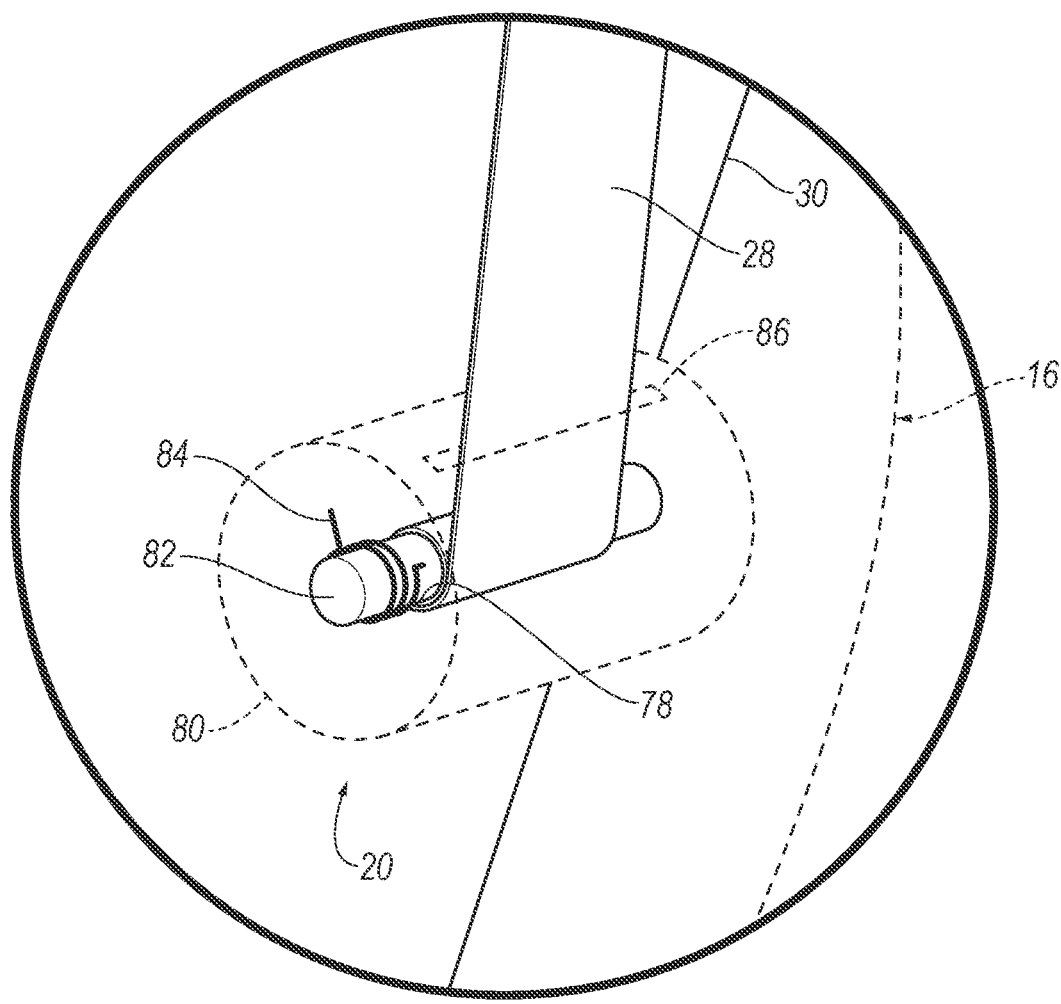
FIG. 3A is a magnified view of a spool supported by the seat.

With reference to FIGS. 3, 3A, and 6 and as discussed above, the assembly 10 includes the spool 22 supported by the seatback 16. Specifically, the spool 22 may be supported by the frame 30 of the seatback 16. The assembly 10 may include a pair of spools 22, i.e., the spool 22 and a second spool 22, spaced from each other along the seatback 16. The spools 22 may be spaced from each other in the cross-seat direction. The head restraint 50 of the seat 14 may be between the spools 22 in the uninflated position and in the inflated position. When the airbag 18 is in the uninflated position, the spools 22 may be concealed under the cover of the seatback 16. As discussed previously, the cover may include the tear seam 64, that may be released in the event of an impact to the allow the airbag 18 to move to the inflated position. The spools 22 may be identical to each other.

The spools 22 are rotatable to allow the belts 28 to pay out. In the example shown in the Figures, the spools 22 include a housing 80 supported by the seatback 16 and is fixed relative to the seatback 16. In such an example, the spools 22 include a spindle 82 rotatably supported by the housing 80. The spools 22 may include a spring 84 between the spindle 82 and the housing 80 of the spools 22 to provide tension to the spindle 82 relative to the housing 80. The spring 84 may include an end fixed to the housing 80 and another end fixed to the spindle 82. As the spindle 82 rotates within the housing 80, the spring 84 may bias the spindle 82 of the spool 22 toward a direction opposite of the rotation of the spindle 82. In other examples, the entire spool 22 may rotate relative to the seatback 16.

With reference the example shown in FIGS. 3, 3A, and 6, in the uninflated position, the belts 28 are wound around the spools 22. Specifically, the belts 28 may be wound around the spindle 82 of the spool. In the inflated position, the belts 28 are extendable from each of the spools 22 to the end 20 of the airbag 18. Specifically, the belts 28 extend from a first end 76 anchored to the spools 22, e.g., the spindle 82, relative to the seat 14 to a second end 78 connected to the end 20 of the airbag 18. The belts 28 are extendable from the spools 22 in the seat-forward direction as the airbag 18 moves to the inflated position. The housing 80 of the spool 22 may include slot 86 that the belts 28 extend through toward the end 20 of the airbag 18. As the airbag 18 inflates to the inflated position, the distance between the first end 76 and the second end 78 increases. In other words, as the airbag 18 inflates to the inflated position, the first end 76 and the second end 78 become farther apart from each other. The belts 28 may unwind from the spindle 82 of the spool 22 as the airbag 18 move toward the inflated position. The spools 22 provide tension on the belts 28 and over the shoulders of the occupant when the airbag 18 is in the inflated position. Specifically, the spring 84 provides tension to the spindle 82 and on the belts 28 in the inflated position. The belts 28 tighten over the shoulders of the occupant as the airbag 18 moves to the inflated position.

The belts 28 may be attached to the airbag 18 by a stitch 66. Specifically, the belts 28 may be attached to the airbag 18 at the end 20 by a stitch 66. In other words, the second end 78 of the belt 28 may be stitched to the airbag 18. The rest of the belts 28 between the first end 76 anchored to the spool 22 and the second end 78 stitched to the end 20 of the airbag 18 may move freely along the airbag 18 as the airbag 18 moves to the inflated position. The airbag 18 may include guides 68, e.g., loops, along the airbag 18 to guide the belts 28 along the airbag 18 and to maintain the proper position of the belts 28 along the airbag 18. As the airbag 18 moves toward the inflated position, the belts 28 may move within the guides 68 and along the airbag 18.

With reference to FIGS. 2-6, the assembly 10 may include a tether retractor 70 supported by the seat bottom 48. Specifically, the seat bottom 48 may include a pair of tether retractors 70 spaced from each other by the seat bottom 48, i.e., the assembly 10 may include a tether retractor 70 on both sides of the seat bottom 48. The tether retractors 70 may be connected to the airbag 18. Specifically, the tether retractor is connected to the end 20 of the airbag 18. The tether retractors 70 are retractable when the airbag 18 is in the inflated position. In other words, the end 20 of the airbag 18 is retractable by the tether retractors 70. A tether 72 may extend from each of the tether retractors 70 to the end 20 of the airbag 18. Specifically, one tether 72 may extend from one of the tether retractors 70 to the first inflation chamber 60 and the other tether 72 may extend from the other of the tether retractors 70 to the second inflation chamber 62. In the uninflated position, the tethers 72 extend along the seat bottom 48 to the end 20 of the airbag 18. The assembly 10 may include releasable pins or other releasable fasteners that connect the tethers 72 to the seat bottom 48 when the airbag 18 is in the uninflated position. In the inflated position, the tethers 72 are retracted to pull the end 20 of the airbag 18 toward the seat bottom 48, i.e., toward the knees of an occupant seated in the seat 14. The releasable pins or other releasable fasteners are released as the airbag 18 moves to the inflated position. In the example shown in the Figures, the tether retractors 70 may be any suitable type. The tether retractor 70 may include a pyrotechnic charge that is activated to activate the pyrotechnic device. The tether retractor 70 may be, for example, a rotary actuator or a linear actuator. In examples where the tether retractors 70 are rotary tether retractor, the pyrotechnic charge rotates a shaft connected to the tether 72 such that the tether 72 wraps around the shaft. In other examples, the tether retractors 70 may be a piston linkage, in which the pyrotechnic charge for example, drives a piston attached to the tether 72; a ball-in-tube linkage, in which a pyrotechnic charge propels a ball or balls over a cogwheel connected to the tether 72; a mechanical linkage, in which a compressed spring attached to the tether 72 is released; or any other suitable type.

The assembly 10 may include a third belt 74 extending along the airbag 18. The third belt 74 extends in a cross-seat direction along the end 20 of the airbag 18. The third belt 74 may extend long the knees of an occupant in the seat 14 to control the kinematics of the occupant in the event of an impact to the vehicle 12.

As shown in FIG. 5, the assembly 10 includes the non-inflatable panel 24 connected to the first inflation chamber 60 and the second inflation chamber 62. Specifically, the non-inflatable panel 24 is connected to the inner panels 46 of the first inflation chamber 60 and the second inflation chamber 62. In the example shown in the Figures, the non-inflatable panel 24 extends along the cross-seat midline M when the first inflation chamber 60 and the second inflation chamber 62 are in the inflated position. In other examples, the non-inflatable panel 24 may be offset from the cross-seat midline M when the gap 42 is offset from the cross-seat midline M. The non-inflatable panel 24 extends along the gap 42 between the first inflation chamber 60 and the second inflation chamber 62 when the inflation chambers 60, 62 are in the inflated position. The non-inflatable panel 24 overlaps the gap 42 between the first inflation chamber 60 and the second inflation chamber 62 in the inflated position. The overlap of the gap 42 by the non-inflatable panel 24 may limit penetration between the first inflation chamber 60 and the second inflation chamber 62, i.e., through the gap 42, in the event of an impact to the vehicle 12.

The occupant seating area 34 of the seat 14 may be between the non-inflatable panel 24 and the seat 14 when the inflation chambers 60, 62 are in the inflated position. Specifically, the non-inflatable panel 24 may be seat-forward of the seatback 16 of the seat 14 when the inflation chambers 60, 62 are in the inflated position. The non-inflatable panel 24 may extend along the gap 42 and in-front and/or upwardly of the occupant seated in the occupant seating area 34, i.e., seat-forward of the seatback 16.

The non-inflatable panel 24 extends from a proximate end 52 to a distal end 54 along the gap 42 between the first inflation chamber 60 and the second inflation chamber 62. The proximate end 52 of the non-inflatable panel 24 may be anchored relative to the seat 14. Specifically, the non-inflatable panel 24 may be connected to the first inflation chamber 60 and the second inflation chamber 62 by a stitch 56 at the proximate end 52. The distal end 54 may be connected to the seat 14 by the proximate end 52 of the non-inflatable panel 24. The distal end 54 of the non-inflatable panel 24 may be movable relative to the inflation chambers 60, 62 and the seat 14 and the proximate end 52 is fixed relative to the seat 14.

The non-inflatable panel 24 may be releasably connected to one of the first inflation chamber 60 or the second inflation chamber 62 between the proximate end 52 and the distal end 54. Specifically, the non-inflatable panel 24 includes the releasable fastener 26 between the proximate end 52 and the distal end 54. The releasable fastener 26 may be releasably connected to one of the first inflation chamber 60 or the second inflation chamber 62. The releasable fastener 26 may be connected to one of the first inflation chamber 60 or the second inflation chamber 62 between the proximate end 52 and the distal end 54.

As shown in the Figures, the non-inflatable panel 24 may include pairs of releasable fasteners 26, e.g., the non-inflatable panel may include a second releasable fastener 26 connected to the other of the first inflation chamber 60 or the second inflation chamber 62 between the proximate end 52 and the distal end 54. The pairs of releasable fasteners 26 may be spaced cross-vehicle from each other and releasable connected to the first inflation chamber 60 or the second inflation chamber 62. Specifically, the releasable fasteners may be connected to the inner panels 46 of the first inflation chamber 60 and the second inflation chamber 62. In other words, the releasable fasteners 26 may be spaced from each other across the gap 42 between the first inflation chamber 60 and the second inflation chamber 62 when the inflation chambers 60, 62 are in the inflated positions.

The non-inflatable panel 24 may include any suitable number of releasable fasteners 26 spaced from each other along the gap 42 between the first inflation chamber 60 and the second inflation chamber 62 and on either side of the gap 42. The example shown in FIG. 5 includes twelve releasable fasteners 26 visible along the gap 42, i.e., six between the non-inflatable panel 24 and each of the first inflation chamber 60 and the second inflation chamber 62.

As in the example shown in the Figures, the releasable fasteners 26 may include hook and loop fasteners. In such an example, the hooks may be fixed to one of the inflation chambers 60, 62 or the non-inflatable and the loops may be fixed to the other of the inflation chambers 60, 62 or the non-inflatable panel 24. To release the non-inflatable panel 24 from the first inflation chamber 60 and the second inflation chamber 62, the hooks may be separated from the loops. In other examples, the releasable fasteners 26 may include snapping fasteners, e.g., plastic snapping fasteners. As with the hook and loop fasteners, the snapping fasteners allow the non-inflatable panel 24 to be releasable from the first inflation chamber 60 and the second inflation chamber 62.

The numerical adverbs "first," "second," and "third" with respect to the inflation chambers 60, 62, the belts 28, and the spools 22 are used herein merely as identifiers and do not signify order or importance. The terms "first" and "second" may be used interchangeably when referring to the inflation chambers 60, 62, the belts 28, and the spools 22 as shown in the Figures.

The airbag 18, i.e., the inflation chambers 60, 62, and non-inflatable panel 24 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a seat having a seatback;
   an airbag supported by the seatback and inflatable to an inflated position, the airbag extending from the seatback to an end in the inflated position;
   a spool rotatably supported by the seatback;
   a belt extending along the airbag in the inflated position, the belt extending from the spool to the end of the airbag;
   the belt being extendable from the spool; and
   a second belt extending along the airbag, the belt extending in a cross-seat direction along the end of the airbag.

2. The assembly of claim 1, wherein the airbag is inflatable from an uninflated position to the inflated position, the belt being wound around the spool in the uninflated position.

3. The assembly of claim 1, wherein the belt includes a first end anchored to the spool relative to the seat and a second end connected to the end of the airbag.

4. The assembly of claim 1, further comprising a second belt spaced from the belt in a cross-seat direction.

5. The assembly of claim 4, wherein the second belt extends along the airbag in the inflated position, the belt and the second belt being spaced from each other in a cross-seat direction.

6. The assembly of claim 5, further comprising a second spool supported by the seatback and spaced from the spool, the second belt extending from the second spool to the end of the airbag.

7. The assembly of claim 6, wherein the seat includes a head restraint supported by the seatback, the head restraint being between the second spool and the spool and the head restraint being between the belt and the second belt.

8. The assembly of claim 4, wherein the airbag includes a first inflation chamber and a second inflation chamber, the belt extending along the first inflation chamber and the second belt extending along the second inflation chamber.

9. The assembly of claim 1, wherein the airbag includes an outer panel and an inner panel between the outer panel and the seat, the belt extending along the outer panel of the airbag.

10. The assembly of claim 1, wherein the seat includes a seat bottom supporting the seatback, a tether retractor supported by the seat bottom and connected to the airbag, the tether retractor being retractable when the airbag is in the inflated position.

11. The assembly of claim 10, further comprising a tether extending from the tether retractor to the end of the airbag.

12. The assembly of claim 11, wherein the tether extends along the seat bottom when the airbag is in an uninflated position.

13. The assembly of claim 1, wherein the airbag inflates in a seat-forward direction.

14. The assembly of claim 1, wherein the belt extends from the spool in a seat-forward direction.

15. The assembly of claim 1, wherein the seatback defines an occupant seating area, the airbag surrounds the occupant seating area in the inflated position.

16. The assembly of claim 15, wherein the occupant seating area is between the belt and the seat when the airbag is in the inflated position.

17. The assembly of claim 1, wherein the belt is attached to the airbag by a stitch.

18. An assembly comprising:
a seat having a seatback;
an airbag supported by the seatback and inflatable to an inflated position, the airbag extending from the seatback to an end in the inflated position;
a spool rotatably supported by the seatback;
a belt extending along the airbag in the inflated position, the belt extending from the spool to the end of the airbag;
the belt being extendable from the spool; and
a second belt spaced from the belt in a cross-seat direction.

19. The assembly of claim 18, wherein a second belt extending along the airbag, the belt extending in a cross-seat direction along the end of the airbag.

20. An assembly comprising:
a seat having a seatback;
an airbag supported by the seatback and inflatable to an inflated position, the airbag extending from the seatback to an end in the inflated position;
a spool rotatably supported by the seatback;
a belt extending along the airbag in the inflated position, the belt extending from the spool to the end of the airbag;
the belt being extendable from the spool;
the seat including a seat bottom supporting the seatback; and
a tether retractor supported by the seat bottom and connected to the airbag, the tether retractor being retractable when the airbag is in the inflated position.

* * * * *